(12) United States Patent
Anderson et al.

(10) Patent No.: US 8,376,682 B2
(45) Date of Patent: Feb. 19, 2013

(54) OBSTRUCTION CLEARANCE MODE FOR SILO WITH RECIPROCATING FRAME

(75) Inventors: Thomas M. Anderson, Naples, FL (US); Charles Wanstrom, Maplewood, MN (US); Franz Tillman, Lagrangoville, NY (US)

(73) Assignee: Schwing Bioset, Inc., Somerset, WI (US)

( * ) Notice: Subject to any disclaimer, the term of this patent is extended or adjusted under 35 U.S.C. 154(b) by 928 days.

(21) Appl. No.: 12/317,445

(22) Filed: Dec. 23, 2008

(65) Prior Publication Data

US 2010/0158652 A1 Jun. 24, 2010

(51) Int. Cl.
*B65G 65/40* (2006.01)

(52) U.S. Cl. .................. 414/311; 414/307; 222/234

(58) Field of Classification Search .............. 414/306, 414/307, 308, 310, 311, 312; 222/200, 233, 222/234; 110/109; 198/736, 737, 747
See application file for complete search history.

(56) References Cited

U.S. PATENT DOCUMENTS

| | | | |
|---|---|---|---|
| 3,539,058 A * | 11/1970 | Ferris | 414/307 |
| 3,817,409 A * | 6/1974 | Weaver | 414/307 |
| 3,985,244 A | 10/1976 | Gessler et al. | |
| 4,043,488 A | 8/1977 | Halvorsen et al. | |
| 4,069,928 A * | 1/1978 | Teske et al. | 414/307 |
| 4,083,462 A * | 4/1978 | Teske et al. | 414/307 |
| 4,157,761 A | 6/1979 | Debor | |
| 4,161,255 A * | 7/1979 | Ropert | 414/323 |
| 4,531,876 A | 7/1985 | Gessler | |
| 4,619,381 A | 10/1986 | Wurtz | |
| 4,731,179 A | 3/1988 | De Baere | |
| 4,763,777 A | 8/1988 | Hooper et al. | |
| 4,805,762 A * | 2/1989 | Hooper et al. | 198/747 |
| 5,407,103 A | 4/1995 | Clarstrom et al. | |
| 5,540,533 A | 7/1996 | Eskelinen | |
| 6,129,215 A | 10/2000 | Brauch et al. | |
| 6,190,105 B1 | 2/2001 | Zey | |
| 6,451,163 B2 | 9/2002 | Prough et al. | |
| 2006/0263180 A1 | 11/2006 | Brey et al. | |

FOREIGN PATENT DOCUMENTS

| | | |
|---|---|---|
| EP | 1086913 A1 | 3/2001 |
| EP | 0988244 B1 | 4/2003 |
| EP | 1053959 B1 | 11/2003 |

* cited by examiner

*Primary Examiner* — Saul Rodriguez
*Assistant Examiner* — Jonathan Snelting
(74) *Attorney, Agent, or Firm* — Kinney & Lange, P.A.

(57) ABSTRACT

A method for clearing obstructions in a silo having a reciprocating frame uses an obstruction clearance mode. The method includes driving at least one frame in a reciprocal motion across a silo floor until sensing an indication that at least one frame has encountered an obstruction. Upon sensing the indication of obstruction, an obstruction clearance mode is initiated in an attempt to clear the obstruction.

7 Claims, 6 Drawing Sheets

OBSTRUCTION CLEARANCE MODE FOR SILO WITH RECIPROCATING FRAME

BACKGROUND

The present invention relates generally to a method and a device for discharging material from a silo. More specifically, the present invention relates a silo having a reciprocating frame.

Silos are large receptacles used to store and discharge materials. Silos usually have an inlet at the top and an outlet at the bottom. Virtually any type of material may be placed into a silo and later discharged. Viscous wet materials, however, are difficult to discharge because they are not free-flowing. For example, municipal waste sludge stored in silos tends to clump together and form bridges over a discharge opening. Discharge devices may be incorporated into the bottom of a silo above a discharge opening to dislodge material bridges and induce sludge flow.

Several types of discharge devices for coaxing sludge out of silos are known. In rectangular and square silos, the push floor design is common. The push floor consists of a series of hydraulically driven ladders that move linearly to convey sludge toward a discharge opening. In circular or polygonal silos, rotating scrapers or movable frames may be incorporated near the silo floor. In the case of rotating scrapers, radial arms extending from a central body include rotating or oscillating scrapers that break up clumps of sludge. In the case of movable frames, an open frame structure reciprocates back and forth over the silo floor pushing and pulling sludge along with it and over a discharge opening. While inclusion of a discharge device near the floor of a silo is known, the construction and operation of such discharge devices are far from ideal.

SUMMARY

An exemplary embodiment of the present invention is a method of clearing an obstruction in a silo having at least one reciprocating frame. The method includes driving the frame in a reciprocal motion across a silo floor until sensing an indication that the frame has encountered an obstruction. Upon sensing the indication that the frame is obstructed, an obstruction clearance mode is initiated. The obstruction clearance mode includes reversing the frame direction to back the frame away from the obstruction and reversing the frame direction to move the frame toward the obstruction with greater force in an attempt to clear the obstruction. Upon clearing the obstruction, the method resumes driving the frame in the reciprocal motion.

In addition, an exemplary embodiment of the present invention is a device for clearing an obstruction in a silo having at least one reciprocating frame. The device includes a silo, which has a floor and an exterior wall attached to the floor. There is an opening located in the floor and at least one conveyor located beneath the opening. At least one reciprocating frame is located immediately above and parallel to the floor. The reciprocating frame is connected to a hydraulic system, which actuates the reciprocating frame between a first position and a second position. There is an obstruction sensor for sensing an indication that the reciprocating frame has encountered an obstruction. A controller controls operation of the hydraulic system to produce reciprocating motion of the reciprocating frame and responds to the obstruction sensor by performing an obstruction clearance mode that uses increased force in an attempt to clear an obstruction.

Another embodiment of the present invention is a device for clearing an obstruction in a silo having at least one reciprocating frame. The device includes a hydraulic system, at least one sensor, and a controller. The hydraulic system has a hydraulic cylinder that is attached to a reciprocating frame for actuating the reciprocating frame across a silo floor between a first position and a second position. There is an obstruction sensor for sensing an indication that the reciprocating frame has encountered an obstruction. A controller controls; operation of the hydraulic system to produce reciprocating motion of the reciprocating frame and responds to the obstruction sensor by performing an obstruction clearance mode that uses increased force in an attempt to clear an obstruction.

DETAILED DESCRIPTION

Figure 1:
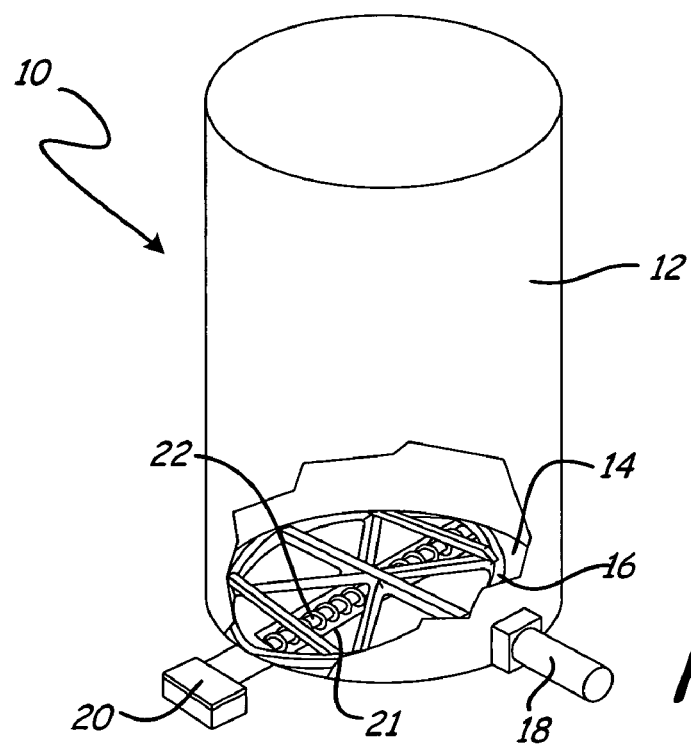
FIG. 1 is a perspective view of a silo containing a reciprocating frame.

FIG. 1 is a perspective view of silo 10 with a portion of exterior wall 12 broken away to expose floor 14 and reciprocating frame 16. Also visible are hydraulic system 18, outlet 20, opening 21, and conveyor 22.

Silo 10 includes exterior wall 12 attached to floor 14. Exterior wall 12 is an upstanding cylinder resting on top of circular floor 14. Reciprocating frame 16 is located within silo 10 immediately above and parallel to floor 14. Reciprocating frame 16 is an open structure attached to hydraulic system 18, which extends beyond exterior wall 12. Outlet 20 is also exterior to exterior wall 12. Opening 21 is an elongated rectangle extending across a diameter of floor 14. Below opening 21 is conveyor 22, which is connected to outlet 20.

Material is generally stored within silo 10 to be discharged at a later time. Usually, material is placed into silo 10 through an opening in a top of silo 10, although other configurations are known. Gravity causes material placed in silo 10 to accumulate near floor 14. All sorts of materials may be stored in silo 10, including dry materials, wet materials, or sludge-like combinations of wet and dry materials. When the material is highly viscous, it tends to resist natural gravitational flow. In at least this instance, it is desirable to include reciprocating frame 16 near floor 14 to mechanically induce flow in the viscous material. Reciprocating frame 16 is attached to hydraulic system 18, which actuates reciprocating frame 16 across floor 14. The resulting back and forth movement of reciprocating frame 16 breaks up cohesive masses while pushing and pulling the material toward opening 21 in floor 14. Beneath opening 21 is at least one conveyor 22. Material falls through opening 21 and onto conveyor 22, which may include a rotating screw and/or a means for metering the material. Conveyor 22 then discharges material from silo 10 via outlet 20. Discharged material may be picked up and transported to another location.

Figure 2:
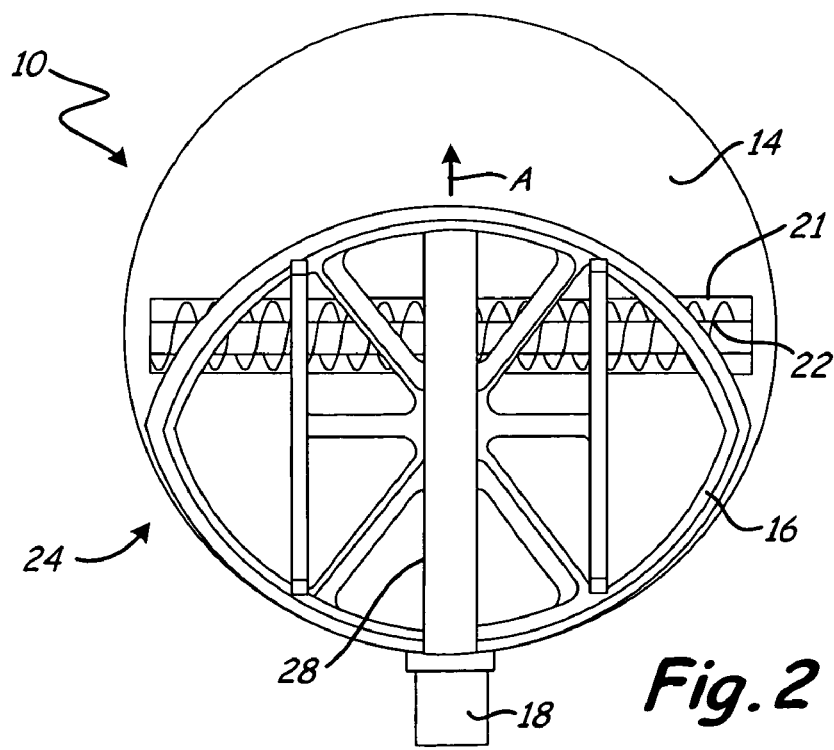
FIG. 2 is a top view of the inside of the silo from FIG. 1 with the reciprocating frame in a first position.
Figure 3:
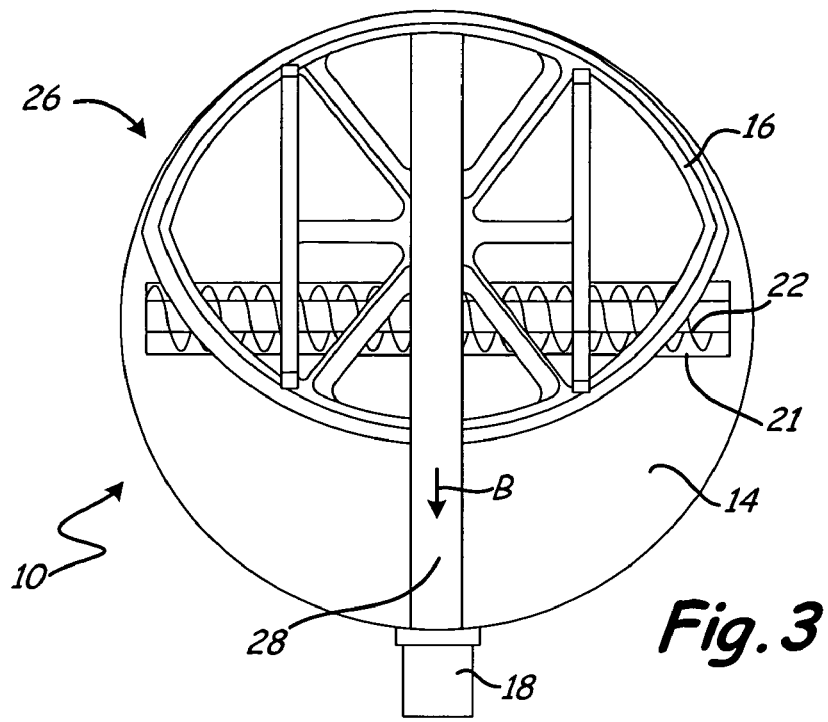
FIG. 3 is a top view of the inside of the silo with the reciprocating frame in a second position.

FIGS. 2 and 3 depict movement of reciprocating frame 16 across floor 14. FIG. 2 is a top view of the inside of silo 10 with reciprocating frame 16 in first position 24. FIG. 3 is a top view of the inside of silo 10 with reciprocating frame 16 in second position 26. Also visible in FIGS. 2 and 3 are hydraulic system 18, opening 21, conveyor 22, and pushrod 28.

Reciprocating frame 16 is connected to hydraulic system 18 via pushrod 28. At rest, reciprocating frame 16 is in first position 24 as depicted in FIG. 2. Once activated, hydraulic system 18 drives pushrod 28 further into silo 10, which actuates reciprocating frame 16 across floor 14 in direction A. Reciprocating frame 16 leaves first position 24 pushing and pulling material toward opening 21 in floor 14. The movement of reciprocating frame 16 agitates viscous material and encourages material to fall through opening 21 onto conveyor 22. Reciprocating frame 16 will continue across floor 14 in direction A until pushrod 28 reaches full extension, or until an obstruction prevents further movement.

If no obstruction is encountered and hydraulic system 18 remains activated, reciprocating frame 16 will reach second position 26 on an opposite end of silo 10, which is depicted in FIG. 3. Reciprocating frame 16 will move across floor 14 once between occupying first position 24 and occupying second position 26. In second position 26, reciprocating frame 16 is remote from hydraulic system 18 and pushrod 28 is fully extended. Pushrod 28 is capable of retracting back toward hydraulic system 18 and actuating reciprocating frame 16 back across floor 14 in direction B. Reciprocating frame 16 leaves second position 26 pushing and pulling material toward opening 21, once again encouraging material to fall through opening 21 onto conveyor 22. If no obstruction is encountered and hydraulic system 18 remains activated, push-rod 28 will retract until reciprocating frame 16 has returned to first position 24. The resulting movement of reciprocating frame 16 agitates viscous material and coaxes material to fall through opening 21 onto conveyor 22 for discharge from silo 10.

Figure 4:
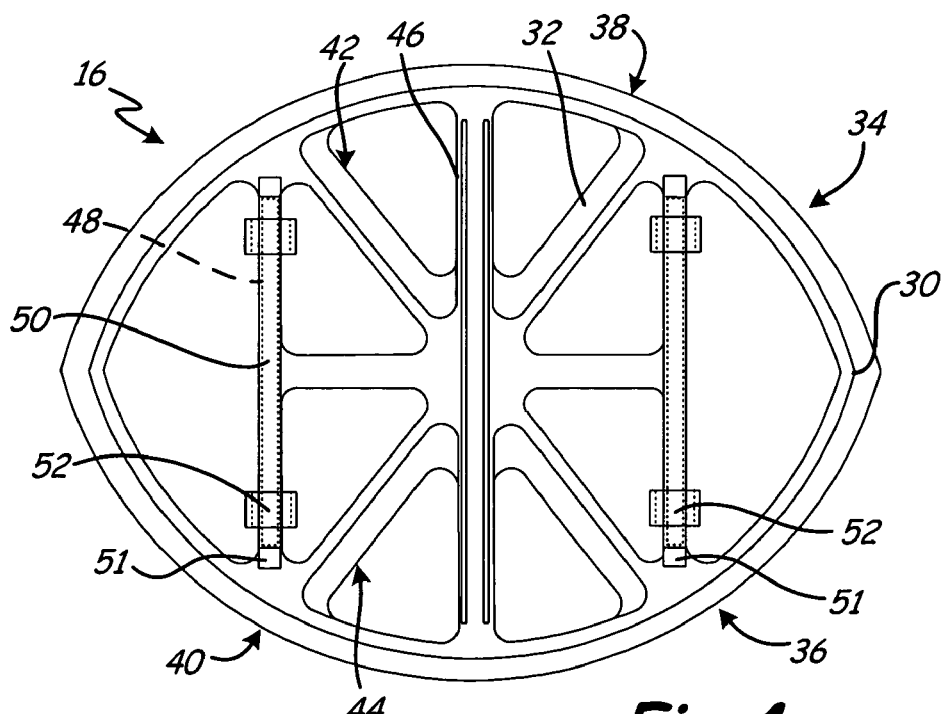
FIG. 4 is a detailed top view of the reciprocating frame.

FIG. 4 is a detailed top view of reciprocating frame 16 including rim 30 and center scraper 32. For descriptive purposes, reciprocating frame 16 is, divided into first half 34 and second half 36. First half 34 of rim 30 has first bevel 38 and second half 36 of rim 30 has second bevel 40. First half 34 of center scraper 32 has third bevel 42 and second half 36 of center scraper 32 has fourth bevel 44. Also visible are bars 46, support members 48, tubes 50, beveled ends 51, and hold-down plates 52.

Reciprocating frame 16 has rim 30, which contains center scraper 32. In one embodiment, rim 30 is shaped like an ellipse and center scraper 32 is shaped like the letter "X", which runs across the y-axis, or minor axis, of rim 32. In an alternative embodiment, rim 30 is rectangular. The shape of rim 30 and center scraper 32 is dependant on a multitude of factors such as the size of the silo and the type of materials to be stored in the silo. Rim 30 and center scraper 32 are capable of assuming alternate shapes while achieving the objectives outlined below.

In the depicted embodiment, center scraper 32 is centrally located within rim 30 so that first half 34 of center scraper 32 is attached to an inside surface of first half 34 of rim 30, and a second half 36 of center scraper 32 is attached to an inside surface of second half 36 of rim 30. First half 34 of rim 30 has first bevel 38 extending along an outer edge. Second half 36 of rim 30 has second bevel 40 extending along an outer edge. First half 34 of center scraper 32 has third bevel 42 extending along an edge opposite first half 34 of rim 30. Second half 36 of center scraper 32 has fourth bevel 44 extending along an edge opposite second half 36 of rim 30. In one embodiment, first bevel 38, second bevel 40, third bevel 42, and fourth bevel 44 all have angles between approximately 1 and 45 degrees, although any acute angle is within the scope of the present invention. First bevel 38, second bevel 40, third bevel 42, and fourth bevel 44 may be machined from a metal, such as carbon steel, or the bevels may include a composite material in order to reduce manufacturing cost and/or the coefficient of friction for the reciprocating frame.

Bars 46 extend substantially across the y-axis of rim 30. First half 34 of bars 46 extend toward first half 34 of rim 30 and second half 36 of bars 46 extend toward second half 36 of rim 30. A plurality of support members 48 are also located within rim 30, but on either side of center scraper 32. Support members 48 run parallel to bars 46 and extend substantially across the y-axis of rim. First half 32 of support members 48 extend toward first half 34 of rim 30 and second half 34 of support members 48 extend toward second half 34 of rim 30. Tubes 50 are located on top of, run the length of, and attach to, support members 48. In one embodiment, tubes 50 are rectangular and have closed beveled ends 51. Tubes 50 may extend through, and be surrounded by, one or more hold-down plates 52. Each hold-down plate 52 is shaped like an upside down letter "U", which is capable of surrounding a tube 50 and attaching to a floor of a silo to prevent the reciprocating frame from drifting.

As described above with reference to FIGS. 2 and 3, reciprocating frame 16 is capable of bi-directional movement across a floor of a silo. Edges of reciprocating frame 16 are beveled to reduce friction between reciprocating frame 16 and material within a silo. When first half 34 is the leading half of reciprocating frame 16, first bevel 38 and third bevel 42 will slide under material within a silo. When second half 36 is the leading half of reciprocating frame 16, second bevel 40 and forth bevel 44 will slide under material within a silo. Thus, the beveled edges of rim 30 and center scraper 32 reduce friction between material and reciprocating frame 16 while agitating material adjacent a floor of a silo. Bars 46 are configured to attach reciprocating frame 16 to a pushrod of a hydraulic system (such as pushrod 28 of hydraulic system 18 in FIG. 3). Support members 48 help maintain the shape of reciprocating frame 16, as well as support tubes 50. Tubes 50 cooperate with one or more hold-down plates 52 to keep reciprocating frame 16 from floating upwards or over to one side. As reciprocating frame 16 moves from a first position to a second position, tubes 50 slide through one or more hold-down plates 52 thereby keeping reciprocating frame 16 adjacent a floor of a silo.

Figure 5A:
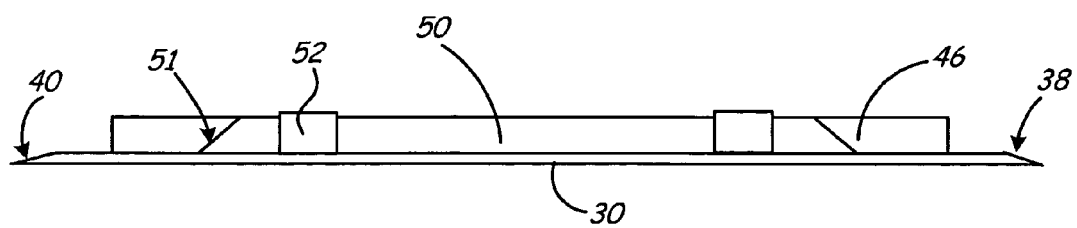
FIG. 5A is a side elevation and FIG. 5B is a front elevation of the reciprocating frame from FIG. 4.
Figure 5B:
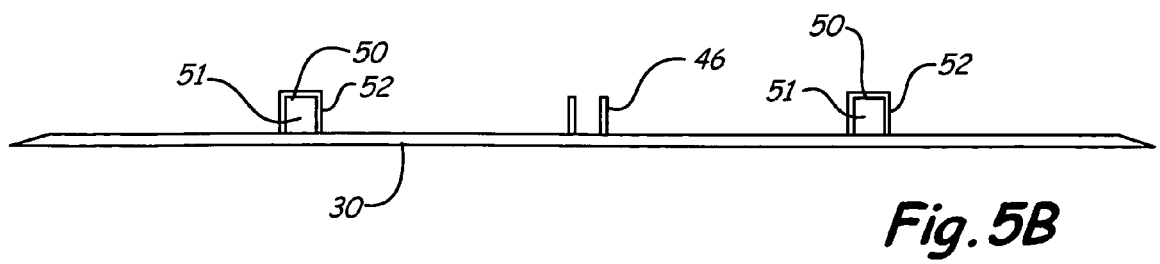

FIG. 5A is a side elevation and FIG. 5B is a front elevation of reciprocating frame 16 showing rim 30, first bevel 38, second bevel 40, bars 46, tubes 50, tube ends 51, and hold-down plates 52. An outer edge of rim 30 has first bevel 38 and second bevel 40. Bars 46 are centrally located in rim 30 and extend upwards to attach to a push-rod of a hydraulic system. Tubes 50 are located on either side of bars 46 and also extend upwards to cooperate with hold-down plates 52. Tubes 50 have closed beveled ends 51. Hold-down plates 52 extend around tubes 50 and attach to a floor of a silo beneath reciprocating frame 16 to hold the reciprocating frame 16 in place. The function of the components of reciprocating frame 16 are described above with regards to FIG. 4 and need not be repeated here.

Figure 6:
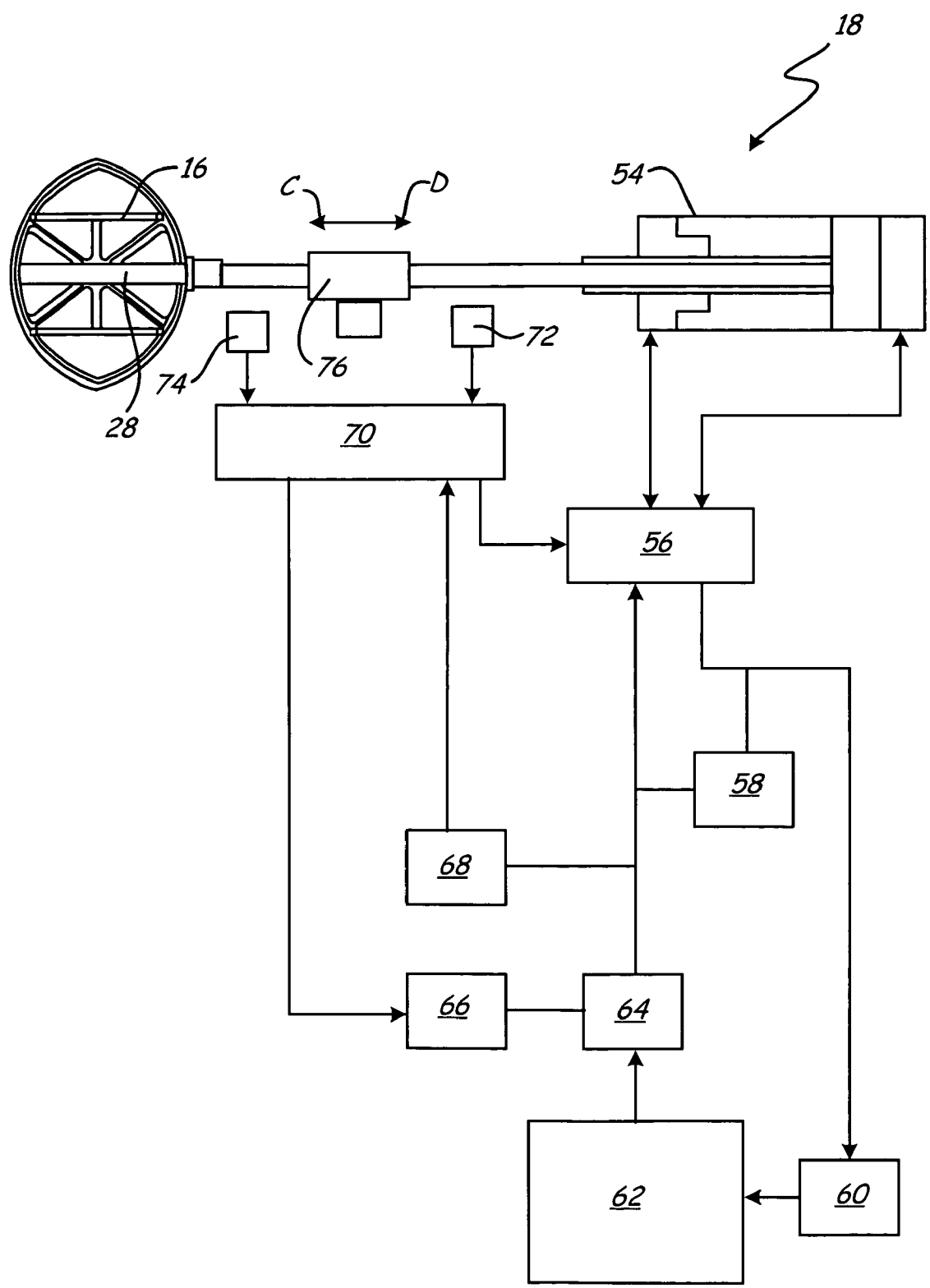
FIG. 6 is a diagram of a hydraulic system capable of actuating a reciprocating frame.

FIG. 6 is a diagram of hydraulic system 18 for actuating reciprocating frame 16 via pushrod 28. Hydraulic system 18 includes hydraulic cylinder 54, solenoid valve 56, pressure relief valve 58, filter 60, tank 62, pump 64, motor 66, pressure sensor 68, controller 70, first limit switch 72, second limit switch 74, and limit switch actuator 76. Hydraulic cylinder 54 is connected to solenoid valve 56. A return line connects solenoid valve 56 to pressure relief valve 58 and filter 60 before reaching tank 62, which serves as the reservoir for hydraulic system 18. An outgoing line connects tank 62 to pump 64, which is driven by motor 66. The outgoing line also connects pump 64 to pressure sensor 68 and solenoid valve 56. Solenoid valve 56, motor 66, and pressure sensor 68 are all in communication with controller 70. Controller 70 receives inputs from first limit sensor 72 and second limit sensor 74, which are activated by limit sensor actuator 76.

Hydraulic cylinder 54 is controlled by solenoid valve 56. Solenoid valve 56 pushes a spool left or right to direct fluid into one side of hydraulic cylinder 54. Fluid then enters one side of hydraulic cylinder 54 causing pushrod 28 to either extend or contract, thereby actuating reciprocating frame 16. A return line extends from solenoid valve 56 to pressure relief valve 58, which maintains proper pressure within hydraulic system 18. The return line continues through filter 60, which prevents contaminants from entering tank 62. Tank 62 acts as a reservoir that stores hydraulic fluid for use in hydraulic system 18. Fluid is pulled into pump 64, which is driven by motor 66, through outgoing hydraulic circuitry, including a connection to pressure sensor 68, back to solenoid valve 56.

Solenoid valve 56, motor 66, and pressure sensor 68 are all in communication with controller 70. Controller 70 manages and controls the operations of hydraulic system 18 through its connections to solenoid valve 56 and motor 66, pressure sensor 68, first limit switch 72, and second limit switch 74. If pressure within hydraulic system 18 builds, pressure sensor 68 will sense this increase in pressure and signal controller 70 that hydraulic frame 16 may have encountered an obstruction. For example, if the hydraulic pressure is normally operated at about 1,500 psi, the pressure sensor may be set to respond to a pressure greater than about 2,400 psi. Controller 70 may initiate an obstruction clearance mode based on input from pressure sensor 68 and/or input from first limit sensor 72 and/or second limit sensor 74. When hydraulic cylinder 54 moves in direction C, hydraulic cylinder 54 extends pushrod 28, thereby actuating reciprocating frame 16 across a silo floor. As hydraulic cylinder 54 moves in direction C, limit sensor actuator 76 moves toward and eventually activates second limit sensor 74. Second limit sensor 74 is activated by limit sensor actuator 76 as pushrod 28 reaches full extension and reciprocating frame 16 reaches a second position. Likewise, hydraulic cylinder 54 moves in direction D, hydraulic cylinder 54 retracts pushrod 28, thereby actuating reciprocating frame 16 back across a silo floor. As hydraulic cylinder 54 moves in direction D, limit sensor actuator 76 moves toward and eventually activates first limit sensor 72. First limit sensor 72 is activated by limit sensor actuator 76 as pushrod 28 reaches full retraction and reciprocating frame 16 reaches a first position. In one embodiment, limit sensor actuator is magnetic. Controller 70 is in communication with both first limit sensor 72 and second limit sensor 74. Controller 70 monitors the activity of first limit sensor 72 and second limit sensor 74 to calculate an expected time window in which first limit sensor 72 and second limit sensor 74 are normally activated. A delay in the activation of either the first limit sensor 72 or the second limit sensor 74 is an indication that reciprocating frame 16 may have encountered an obstruction. Controller 70 may respond by initiating an obstruction clearance mode for reciprocating frame 16.

Figure 7:
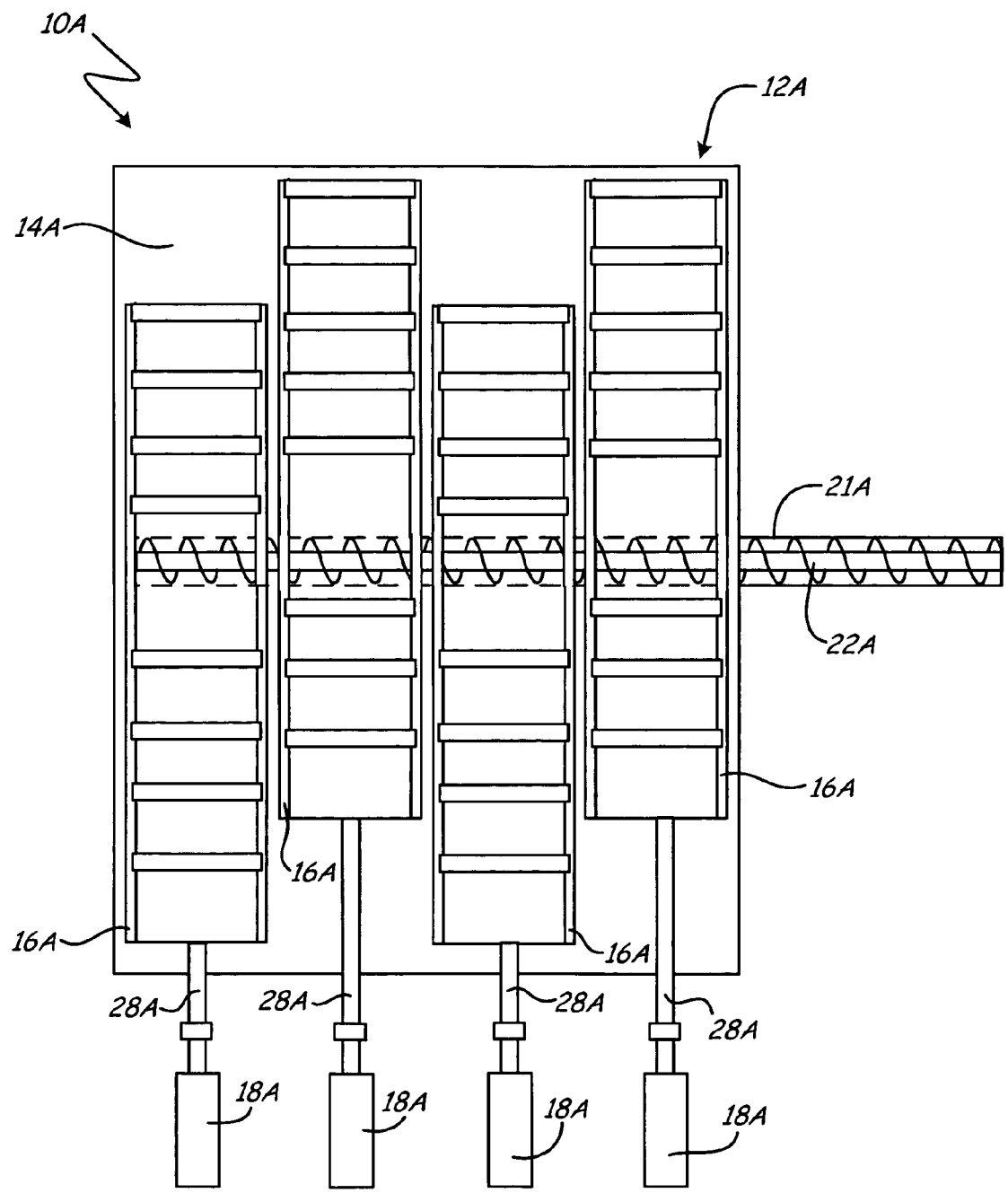
FIG. 7 is a top view of an alternative embodiment of a silo having a plurality of reciprocating frames.

FIG. 7 is a top view of an alternative embodiment of silo 10A having a plurality of reciprocating frames 16A. Illustrated in FIG. 7 are silo 10A, exterior wall 12A, floor 14A, reciprocating frames 16A, hydraulic cylinders 18A, opening 21A, screw conveyor 22A, and push-rods 28A. The components of silo 10A are substantially similar to the components of silo 10 described above. The discussion below focuses on the differences between silo 10 and silo 10A, namely, the number and shape of reciprocating frames 16A.

Silo 10A is defined by upstanding exterior wall 12A resting on top of rectangular floor 14A. In the depicted embodiment, four reciprocating frames 16A are located immediately above and parallel to floor 14A, although more or less reciprocating frames 16A are equally possible. Reciprocating frames 16A are attached to, and actuated by, hydraulic cylinders 18A. Screw conveyor 22A is located beneath opening 21A in floor 14A. In the depicted embodiment, opening 21A and screw conveyor 22A are all centrally located, although they can be offset to one side or another. Connecting reciprocating frames 16A to hydraulic cylinders 18A are push-rods 28A.

Reciprocating frames 16A operate in much the same manner as reciprocating frame 16 described above. Hydraulic cylinders 18A extend and retract push-rods 28A, which actuate reciprocating frames 16A across floor 14A. As pushrods 28A extend further into silo 10A, reciprocating frames 16A are moved to a position remote from hydraulic cylinders 18A. As pushrods 28A retract back out of silo 10A, reciprocating frames 16A are moved to a position adjacent hydraulic cylinders 18A. In the depicted embodiment, reciprocating frames 16A are staggered so that as one moves away from hydraulic cylinder 18A the neighboring reciprocating frame 16A is moves closer to hydraulic cylinder 18A. When reciprocating frames 16A move across floor 14A, material within silo 10A is pushed and pulled toward opening 24A such that it can fall through opening 24A onto screw conveyor 22A.

Reciprocating frames 16A are controlled independently by a controller (such as controller 70 of FIG. 6). If one reciprocating frame 16A encounters an obstruction, the controller initiates an obstruction clearance mode for that one reciprocating frame 16A while operating the other reciprocating frames 16A in a normal mode. For example, if reciprocating frame #3 encountered an obstruction, then reciprocating frame #3 would enter the obstruction clearance mode while reciprocating frames #1, #2, and #4 continue to operate normally. Furthermore, if the obstruction is not cleared by the obstruction clearance mode, a single reciprocating frame 16A may be shut down or operated manually while the remaining reciprocating frames operate in a normal mode. Continuing the above example, reciprocating frame #3 would be shut down while reciprocating frames #1, #2, and #4 continue to reciprocate normally.

Figure 8:
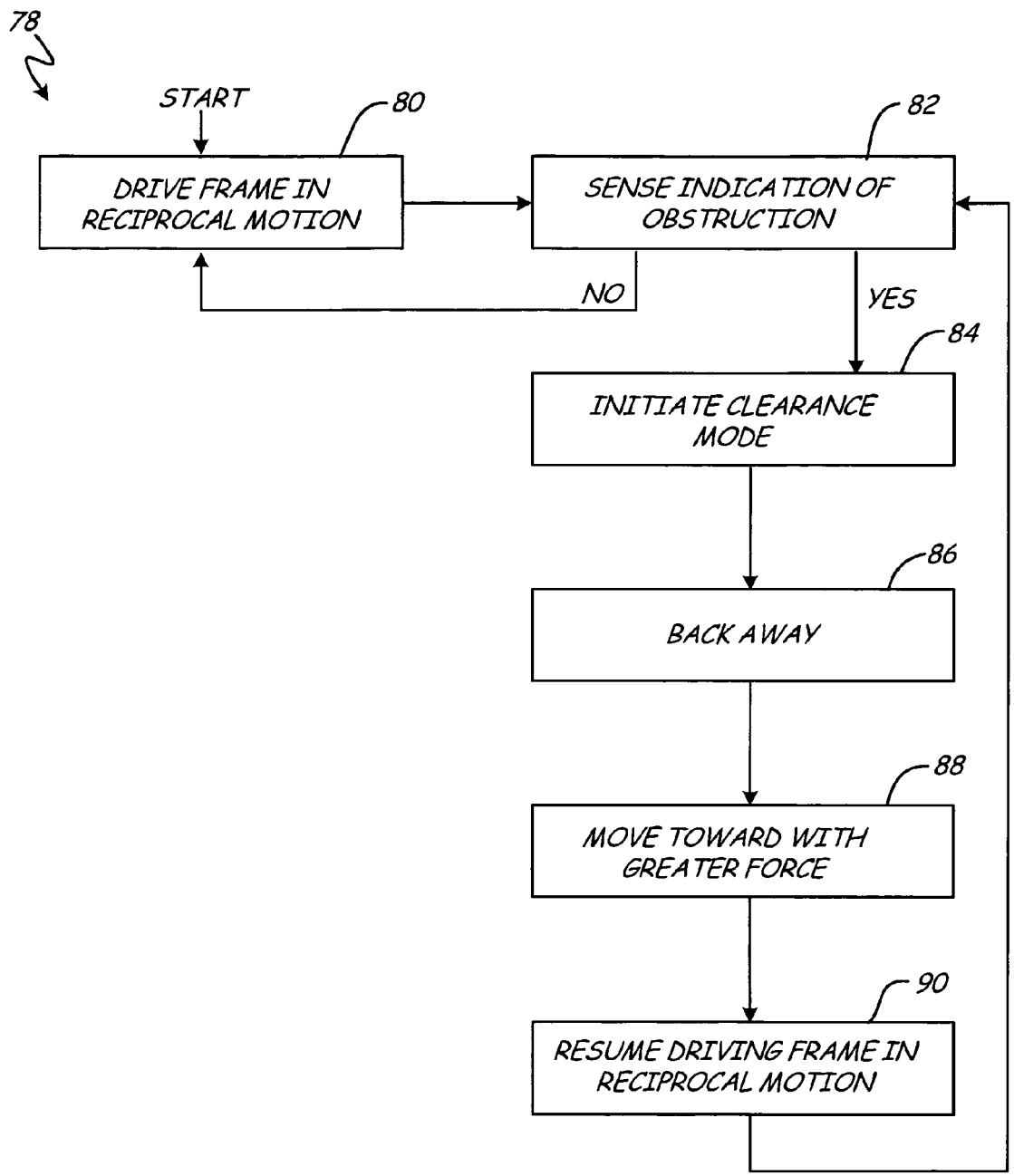
FIG. 8 is a diagram of a method of clearing an obstruction in a silo having a reciprocating frame.

FIG. 8 is a diagram of method 78 for clearing an obstruction in a silo. Method 78 includes: driving at least one frame in a reciprocal motion across a silo floor 80, sensing an indication that the frame has encountered an obstruction 82, initiating an obstruction clearance mode 84 including reversing the frame direction to back the frame away from the obstruction 86 and then reversing the frame direction to move the frame toward the obstruction with greater force in an attempt to clear the obstruction 88 and resume driving the frame in a reciprocal motion 90.

Method 78 will usually begin when a hydraulic system (such as hydraulic system 18 of FIG. 6) is activated and begins driving a frame in a reciprocal motion across a silo floor 80. A controller (such as controller 70 of FIG. 6) monitors the functions of the hydraulic system and is capable of sensing an indication that the frame has encountered an obstruction 82. The indication of obstruction could be an excessive build-up of pressure at pressure sensor 68 and/or a delay in the time window when a first limit sensor and/or a second limit sensor should be activated and send input to the controller. Upon such an indication of obstruction, the controller initiates an obstruction clearance mode 84. The obstruction clearance mode 84 includes reversing the frame direction to back the frame away from the obstruction 86 and then reversing the frame direction to move the frame toward the obstruction with greater force in an attempt to clear the obstruction 88. Greater force will generally result from increasing hydraulic pressure within the hydraulic system by approximately 5% to 25% in comparison to the force that the hydraulic system normally uses to actuate the reciprocating frame. The method then resumes driving the frame in the reciprocal motion 90. If the obstruction was cleared, then the controller will not sense an indication of obstruction 82 and method 78 will continue driving the frame in a reciprocal motion across a silo floor 80. If the obstruction was not cleared, the controller will sense the indication of the obstruction 82 and the obstruction clearance mode will be initiated 84 again with increasing force. After a preset number of failures, the obstruction clearance mode will shut down and trigger an alarm indicating that maintenance is needed. While automatic operation of a reciprocating frame is "shut down", it is still possible to manually operate the reciprocating frame and empty silo contents. Method 78 reduces costs for maintaining a silo with a reciprocating frame by initiating an obstruction clearance mode prior to shut down and alarm.

Although the present invention has been described with reference to preferred embodiments, workers skilled in the art will recognize that changes may be made in form and detail without departing from the spirit and scope of the invention.

The invention claimed is:

1. A device for clearing an obstruction in a silo having a reciprocating frame, the device comprising:
    a hydraulic system including:
        a hydraulic cylinder attached to a reciprocating frame by a pushrod, the hydraulic cylinder actuating the reciprocating frame in a linear manner across a silo floor between a first position and a second position;
        a solenoid valve fluidly connected to the hydraulic cylinder, the solenoid valve directing hydraulic fluid to into the hydraulic cylinder causing either extension toward the first position or retraction toward the second position;
        a pump fluidly connected to the solenoid valve, the pump for pumping hydraulic fluid to the solenoid valve;
        a motor connected to the pump for driving the pump; and
        a tank fluidly connected to the pump and the solenoid valve, the tank for storing hydraulic fluid;
    an obstruction sensor for sensing an indication that the reciprocating frame has encountered an obstruction; and
    a controller in communication with the obstruction sensor and the hydraulic system, the controller controlling operation of the hydraulic system to deliver the hydraulic fluid at a first pressure and produce reciprocating motion of the reciprocating frame, the controller responding to the obstruction sensor by performing an obstruction clearance mode that includes causing the hydraulic system to deliver hydraulic fluid at a second pressure thereby increasing force in an attempt to clear an obstruction.

2. The device of claim 1, wherein the obstruction sensor includes a first sensor and a second sensor activated by a sensor actuator when the reciprocating frame occupies the first position and the second position respectively, and wherein the indication that the reciprocating frame has encountered an obstruction is a delay in the activation of either the first sensor or the second sensor.

3. The device of claim 2, wherein the first sensor and the second sensor are limit sensors.

4. The device of claim 2, wherein the sensor actuator is magnetic.

5. The device of claim 1, wherein the obstruction sensor includes a pressure sensor and the indication that the reciprocating frame has encountered an obstruction is an increase in hydraulic pressure within the hydraulic system.

6. The device of claim 1, further comprising:
    a pressure relief valve connected to the solenoid valve to relieve an excessive build-up of pressure within the device.

7. The device of claim 1, wherein in the obstruction clearance mode the controller causes the hydraulic system to increase pressure for the hydraulic fluid by approximately 5% to 25%.

* * * * *